United States Patent [19]

Siegmund

[11] Patent Number: 5,357,504
[45] Date of Patent: Oct. 18, 1994

[54] FACILITY AND METHOD FOR D CHANNEL PACKET SWITCHING

[75] Inventor: Gerd Siegmund, Stuttgart, Fed. Rep. of Germany.

[73] Assignee: Alcatel N.V., Netherlands

[21] Appl. No.: 837,740

[22] Filed: Feb. 19, 1992

[30] Foreign Application Priority Data

Feb. 27, 1991 [DE] Fed. Rep. of Germany ....... 4106183

[51] Int. Cl.$^5$ .............................................. H04J 3/12
[52] U.S. Cl. .................... 370/60; 370/94.1; 370/110.1
[58] Field of Search .................. 370/94.1, 110.1, 60

[56] References Cited

U.S. PATENT DOCUMENTS 4,688,214 8/1987 DeWitt et al. ................ 370/110.1 X
4,755,992 7/1988 Albal ................................. 370/94.1
4,821,265 4/1989 Albal et al. .................... 370/94.1 X

OTHER PUBLICATIONS

US-Z: Domann, Gunter: Two Years of Experience with Broadband ISDN Field Trail. In: IEEE Communications Magazine, Jan. 1991, S.97–104.
US-Z: Wernik, Marek R; Munter, Ernst A.: Broadband Public Network and Switch Architecture, In: IEEE Communications Magazine, S.83–89.
"ISDN: European and Worldwide Standardisation", *Electrical Communication*, vol. 64, No. 1, 1990, pp. 51–56.
"Paketvermittlungstechnik", *Unterrichtsblatter der Deutschen* Bundespost, 43rd year, No. 4, pp. 167–193.
M. Wizgall, "Datenkommunikation mit Nebenstellenanlagen", NTZ-Nachrichtentechnische Zeitschrift, Bd. 40, Nr. 5, Mai 1987, Berlin, W. Germany, pp. 338–340, 342–344.
H. Yamashita, et al, "DIPS Communication Control Processor ISDN Strategy", NTT Review, Bd. 1, Nr. 4, Nov. 1989, Tokyo, Japan, pp. 61–73.
A. Chalet, "ISDN Impact on Switching System Architectures", Globecom '86, Session 10, Paper 2, Bd. 1, 1 Dec. 1986, Houston, Tex., pp. 0334–0338.
N. Skaperda, "The EWSD Today, Plans for Tomorrow", IEEE Global Telecommunications Conference & Exhibition, Session 37, Paper 4, Bd. 3, Nov. 28, 1988, Hollywood, Fla., pp. 1211–1220.
J. L. Neigh, "ISDN Evolution in a Business Environment", Proceedings of the National Communications Forum, Bd. 41, Nr. 2, 1987, Oak Brook, Ill., pp. 1041–1047.
Patent Abstracts of Japan, vol. 14, No. 401 (E–971), 3 Aug. 1990 and JP-A-21 51 153 (Hitachi).

*Primary Examiner*—Douglas W. Olms
*Assistant Examiner*—Russell W. Blum
*Attorney, Agent, or Firm*—Ware, Fressola, Van Der Sluys & Adolphson

[57] ABSTRACT

For packet-data switching in the ISDN D channel through a digital exchange, the need for a costly frame handler for processing OSI Layer 2 and 3 functions is to be eliminated; in response to destination information in the SET UP message, an OSI Layer 3 control unit (SE3) establishes a connection between the two OSI Layer 2 control units (SE1, SE2) of the exchange (VST), to which the data terminals (DEE1, DEE2) are connectable and direct packet-data transfer can then take place between the OSI Layer 2 control units without further participation of the Layer 3 control unit.

5 Claims, 1 Drawing Sheet

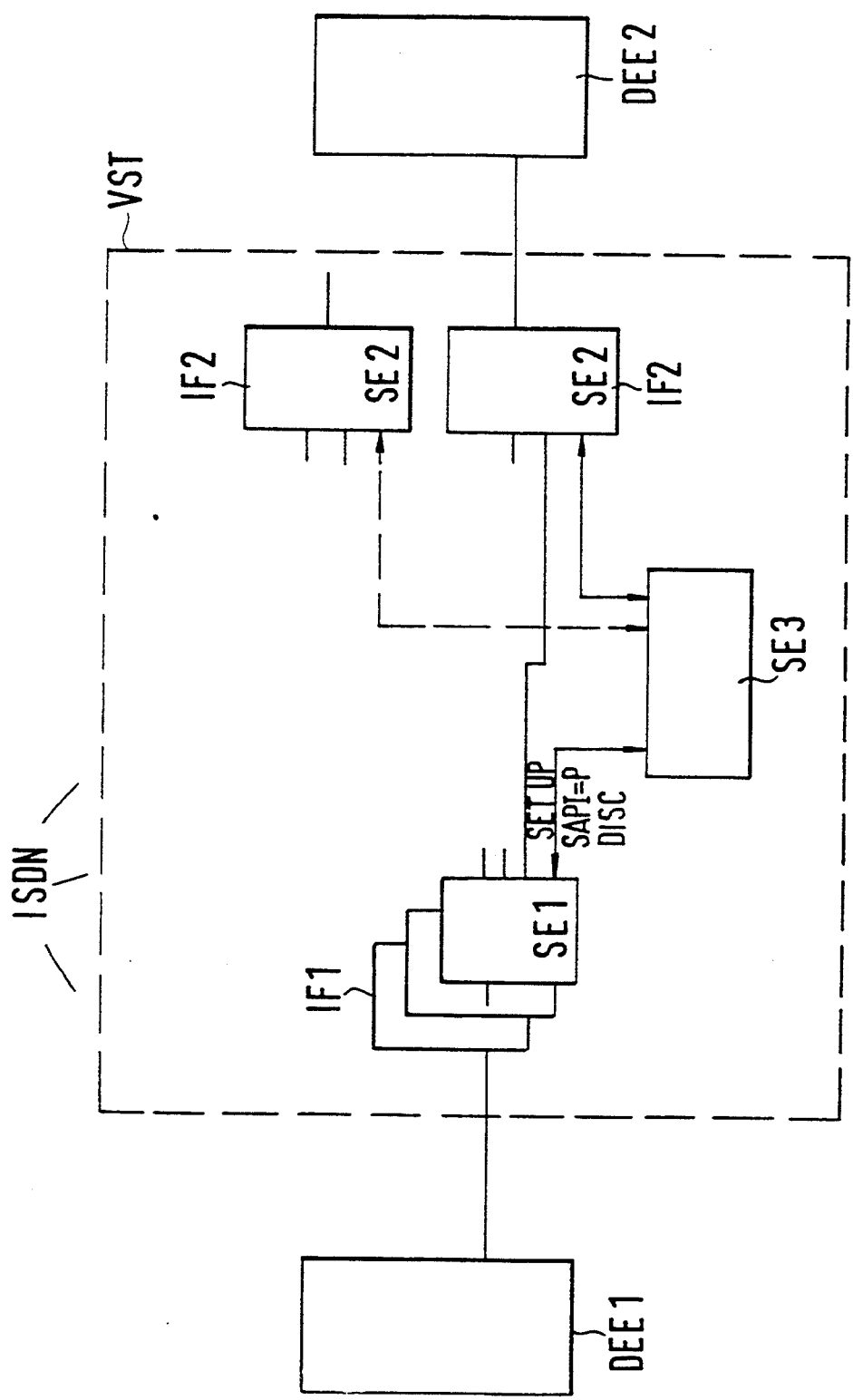

FACILITY AND METHOD FOR D CHANNEL PACKET SWITCHING

TECHNICAL FIELD

The present invention relates to a facility for D channel packet switching through a digital exchange in an integrated services digital network and to a D channel packet-switching method using such a facility.

BACKGROUND OF THE INVENTION

For the integrated services digital network—ISDN—it is estimated that about 2 million potential users are interested in a low-bit-rate ISDN packet service (D channel). The ETSI (European Telecommunications Standards Institute) is currently drawing up standards which define the various types of accesses to X.25 packet services by ISDN subscribers. Packet switching is to be implemented in the D channel ("ISDN-Paketdienste", Elektrisches Nachrichtenwesen, Vol. 64, No. 1, 1990, pp. 41 to 50 "ISDN: European and Worldwide Standardisation", Electrical Communication, Vol. 64, No. 1, 1990, pp. 51-56.

To permit the connection of data terminals with X.25 interfaces to a digital exchange in the ISDN, use is made of CCITT (International Telegraph and Telephone Consultative Committee) X.31 Recommendation.

To switch packet data in the D channel through a digital exchange, a so-called frame handler or a so-called frame switch is commonly inserted in a connection to control communication between two data terminals, OSI (Open System Interconnection) Layer 2 and OSI Layer 3 functions. Such a frame switch consists of a processor and a switching unit and controls the connection setup and the handling of the packet data. As a result, the processor required for the OSI layer 3 functions is very heavily loaded by the D channel packet handling.

DISCLOSURE OF THE INVENTION

It is, therefore, the object of the invention to provide a facility and a method for D channel packet switching which permit a considerable simplification of the control and packet-transmission functions.

According to the present invention, a facility for D channel packet switching through a digital exchange (VST) in an integrated services digital network (ISDN) between a first data terminal (DEE1) and a second data terminal (DEE2) which are connectable to a first interface (IF1) of a plurality of first interfaces of the exchange (VST) and to a second interface (IF2) of a plurality of second interfaces of the exchange (VST), respectively, each of the first interfaces containing a first control unit (SE1) controlling all OSI Layer 2 functions, and each of the second interfaces containing a second control unit (SE2) controlling all OSI Layer 2 functions, the exchange (VST) further including a third control unit (SE3) controlling all OSI Layer 3 functions which is connected to the first control units (SE1) and, in response to a setup message and upon receipt of a packet-data identifier (SAPI=p) from the first data terminal (DEE1), sets up a connection between the associated first control unit (SE1) and the second control unit (SE2) associated with the second data terminal (DEE2) for the direct exchange of packet data.

Through the facility according to the invention, a direct connection between a first and a second exchange control unit controlling all OSI Layer 2 functions is established for the transfer of packet data. The establishment of the connection is initiated by a third control unit controlling all OSI Layer 3 functions, which remains disconnected and, hence, unloaded during the exchange of packet data.

This eliminates the need for the frame handler, since D channel packet switching is carried out by means of existing OSI Layer 2 and OSI Layer 3 control units.

In further accord with the present invention, a method of switching packets of data in the D channel using a facility as described above comprises the step of: signalling an incoming call from the first data terminal (DEE1) by an OSI Layer 3 setup message (SET UP) to the third control unit (SE3) of the exchange (VST); upon receipt of a packet-data identifier (SAPI=p), controlling, in accordance with destination information contained in the setup message, the setup of a connection between the second control unit (SE2) associated with the second data terminal (DEE2) and the first control unit (SE1) associated with the first data terminal (DEE1) for the direct exchange of packet data between the two OSI Layer 2 control units; and releasing the OSI Layer 3 connections with the third control unit (SE3).

The teaching according to the invention will now be explained in more detail with reference to an embodiment of the invention as shown in the accompanying drawing.

BRIEF DESCRIPTION OF THE DRAWING

The sole figure shows a digital exchange in an integrated services digital network, according to the present invention.

BEST MODE FOR CARRYING OUT THE INVENTION

For D channel packet switching between a first data terminal DEE1 and a second data terminal DEE2 through a digital exchange VST in an integrated services digital network ISDN as shown in the accompanying figure, the exchange includes a plurality of first interfaces IF1 and a plurality of second interfaces IF2 to which the data terminals are connectable. Each of the first interfaces IF1 and each of the second interfaces IF2 contains a first control unit SE1 and a second control unit SE2, respectively, which controls all OSI Layer 2 functions (OSI=Open System Interconnection, cf. "Paketvermittlungstechnik", Unterrichtsblätter der Deutschen Bundespost, 43rd year, No. 4, pages 167 to 193), with the first control unit SE1 connected to a third exchange control unit SE3 which controls all OSI Layer 3 functions.

The first control unit SE1 in the first interface, e.g., an ISDN $S_O$ interface, has a plurality of inputs and outputs, the outputs being connectable, preferably via a bus, to the inputs of the plurality of second interfaces IF2 in accordance with the destination address, and to inputs of the control unit SE3.

For packet-data transmission in the D channel, the signalling and packet data are identified by the service access point identifier SAPI=s, p.

In response to signalling data in an incoming call, SAPI=s, from the first data terminal DEE1 via the first interface IF1, the first control unit SE1 sends an OSI Layer 3 setup message (contains destination information=call number) SET UP to the third control unit SE3 of the exchange VST.

On receipt of a packet-data identifier SAPI=p, the third control unit SE3 controls the establishment of a connection between a second control unit SE2 associated (in accordance with the destination information) with the second data terminal DEE2 and the first control unit SE1 associated with the first data terminal DEE1.

After the connection has been established, the packet data is transferred directly between the first control unit SE1 and the second control unit SE2 (pure OSI Layer 2 function), without further participation of the third control unit SE3. The OSI Layer 3 connections to the third control unit SE3 can be released for the duration of the direct data exchange.

As a result of the direct connection between the OSI Layer 2 control units, which is initiated by the OSI Layer 3 control unit, the OSI Layer 3 control unit SE3 is not loaded by D channel packet data SAPI=p. This eliminates the need for a specific frame handler as is required in the prior art.

On receipt of an OSI Layer E packet data end identifier in the first control unit SE1, a disconnect message DISC is sent to the third control unit SE3 of the exchange VST.

The third control unit SE3 then controls the release of the connection between the first and the second control units up to the first and second data terminals.

Thus, D channel packet data can be transferred within an exchange by means of the existing OSI Layer 2 control units under control of an OSI Layer 3 control unit, without the need for additional hardware.

Of course, the digital exchange may also be a private telecommunications system.

I claim:

1. Facility for D channel packet switching through a digital exchange (VST) in an integrated services digital network (ISDN) between a first data terminal (DEE1) and a second data terminal (DEE2) which are connectable to a first interface (IF1) of a plurality of first interfaces of the exchange (VST) and to a second interface (IF2) of a plurality of second interfaces of the exchange (VST), respectively, each of the first interfaces containing a first control unit (SE1) controlling all OSI Layer 2 functions, and each of the second interfaces containing a second control unit (SE2) controlling all OSI Layer 2 functions, the exchange (VST) further including a third control unit (SE3) controlling all OSI Layer 3 functions which is connected to the first control units (SE1) and, in response to a setup message and upon receipt of a packet-data identifier (SAPI=p) from the first data terminal (DEE1), by means of a connection between the third control unit (SE3) and a second control unit (SE2) associated with the second data terminal (DEE2) sets up a connection between the associated first control unit (SE1) and the second control unit (SE2) associated with the second data terminal (DEE2) for the direct exchange of packet data.

2. A facility as claimed in claim 1 wherein the first control unit (SE1) in each first interface (IF1) has a plurality of inputs and outputs, the outputs being connectable to inputs of the plurality of second interfaces (IF2) and to inputs of the third control unit (SE3).

3. A facility as claimed in claim 2 wherein the outputs of the first interface and the inputs of the second interface are interconnectable via a bus.

4. Method of switching packets of data in the D channel using a facility as claimed in claim 1 and comprising the following steps:

signalling an incoming call from the first data terminal (DEE1) by an OSI Layer 3 setup message (SET UP) to the third control unit (SE3) of the exchange (VST);

upon receipt of a packet-data identifier (SAPI=p), controlling, in accordance with destination information contained in the setup message, the setup of a connection between the second control unit (SE2) associated with the second data terminal (DEE2) and the first control unit (SE1) associated with the first data terminal (DEE1) for the direct exchange of packet data between the two OSI Layer 2 control units, and releasing the OSI Layer 3 connections with the third control unit (SE3).

5. Method as claimed in claim 4, comprising the following steps:

upon receipt of an OSI Layer 2 packet data end identifier in the first control unit (SE1), sending a disconnect message (DISC) to the third control unit (SE3), and controlling a release of the connections between the first and second control units and to the first and second data terminals via the third control unit (SE3).

* * * * *